US010228252B2

(12) United States Patent
Georgy et al.

(10) Patent No.: US 10,228,252 B2
(45) Date of Patent: Mar. 12, 2019

(54) METHOD AND APPARATUS FOR USING MULTIPLE FILTERS FOR ENHANCED PORTABLE NAVIGATION

(71) Applicant: TRUSTED POSITIONING, INC., Calgary (CA)

(72) Inventors: Jacques Georgy, Calgary (CA); Zainab Syed, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/831,706

(22) Filed: Aug. 20, 2015

(65) Prior Publication Data

US 2016/0061605 A1   Mar. 3, 2016

Related U.S. Application Data

(60) Provisional application No. 62/045,422, filed on Sep. 3, 2014.

(51) Int. Cl.
| | | |
|---|---|---|
| *G01C 21/20* | (2006.01) | |
| *G01C 21/12* | (2006.01) | |
| *G01S 19/38* | (2010.01) | |
| *G01C 21/16* | (2006.01) | |

(52) U.S. Cl.
CPC ............. *G01C 21/20* (2013.01); *G01C 21/12* (2013.01); *G01C 21/165* (2013.01); *G01S 19/38* (2013.01)

(58) Field of Classification Search
CPC ...... G01C 21/165; G01C 21/12; G01C 21/20; G01S 19/38
See application file for complete search history.

(56) References Cited

U.S. PATENT DOCUMENTS

| | | | | |
|---|---|---|---|---|
| 6,240,367 | B1 * | 5/2001 | Lin | G01C 21/28 342/357.31 |
| 6,278,945 | B1 * | 8/2001 | Lin | G01C 21/165 701/472 |
| 6,311,129 | B1 * | 10/2001 | Lin | G09B 9/08 342/422 |
| 6,317,688 | B1 * | 11/2001 | Bruckner | G01C 21/005 244/3.1 |
| 6,408,245 | B1 * | 6/2002 | An | G01C 21/165 340/450 |
| 2008/0004796 | A1 * | 1/2008 | Schott | G01C 21/005 701/434 |
| 2008/0077325 | A1 * | 3/2008 | Bye | G01C 21/165 701/500 |
| 2010/0049439 | A1 * | 2/2010 | Cho | G01C 21/165 701/472 |
| 2010/0265126 | A1 * | 10/2010 | Mao | G01S 19/47 342/357.3 |
| 2011/0178705 | A1 * | 7/2011 | Pakzad | G01C 21/20 701/533 |

* cited by examiner

*Primary Examiner* — Stephen Holwerda
(74) *Attorney, Agent, or Firm* — Bay Area Technology Law Group PC

(57) ABSTRACT

An apparatus and method are disclosed for enhancing a navigation solution of a portable device and a platform. Motion sensor data may be obtained corresponding to motion of the portable device, such that a first filter may be configured to output a navigation solution and at least one second filter may be configured to use the motion sensor data to generate at least one value. The at least one generated value may then be used with the first filter to enhance the navigation solution output by the first filter.

35 Claims, 6 Drawing Sheets

METHOD AND APPARATUS FOR USING MULTIPLE FILTERS FOR ENHANCED PORTABLE NAVIGATION

CROSS REFERENCE TO RELATED APPLICATIONS

This application claims priority from and benefit of U.S. Provisional Patent Application Ser. No. 62/045,422, filed Sep. 3, 2014, which is entitled "METHOD AND APPARATUS FOR USING MULTIPLE FILTERS FOR ENHANCED PORTABLE NAVIGATION," which is a incorporated by reference in its entirety.

FIELD OF THE PRESENT DISCLOSURE

The present disclosure relates to a method and apparatus for enhancing a navigation solution of a device within a platform (such as for example person, vehicle, or vessel) through the use of multiple filters, wherein mobility of the device may be constrained or unconstrained within the platform, and wherein the device can be tilted to any orientation and still provide seamless navigation.

BACKGROUND

Inertial navigation of a platform is based upon the integration of specific forces and angular rates as measured by inertial sensors (e.g., accelerometer, gyroscopes) of a device containing the sensors and positioned within a motion-capable platform. In traditional systems, the device is tethered to the platform. Measurements from the device may be used to determine the position, velocity and attitude of the device and/or the platform.

Alignment of the inertial sensors within the platform (i.e., alignment of the device containing the sensors with the platform's forward, transversal and vertical axis) is typically required for traditional inertial navigation systems. Where the inertial sensors are not properly aligned, the positions and attitude calculated using measurements from the inertial sensors will not be representative of the state of the platform. As such, in order to achieve high accuracy navigation solutions, inertial sensors must be tethered within the platform and careful manual mounting of the device within the platform is needed.

Portable navigation devices (or navigation-capable devices), however, are able to move, whether constrained or unconstrained within the platform (such as for example a person, vehicle, or vessel of any type), and careful mounting or tethering of the device to the platform is not an option.

As navigation-capable devices (e.g., mobile/smart phones) become increasingly popular, they can come equipped with Assisted Global Positioning System (AGPS) chipsets having high sensitivity capabilities capable of providing absolute positioning of the platform (e.g. user) even in environments without a clear line of sight to satellite signals. In environments where AGPS information alone is not enough, such as deep indoors or in challenging downtown navigation or localization, one possible solution is to incorporate cell tower identification or, if possible, trilateration of cell towers for a position fix (where AGPS solution is unavailable). Despite these two known positioning methods available in many mobile devices, accurate indoor localization still presents a challenge and fails to satisfy the accuracy demands of current location based services (LBS). Additionally, these methods may only provide the absolute heading of the platform, without any information on the device's heading.

Mobile navigation-capable devices (e.g., mobile/smart phones) can come equipped with Micro Electro Mechanical System (MEMS) sensors that are used predominantly for screen control and entertainment applications. These sensors have not been broadly used to date for navigation purposes due to very high noise, large random drift rates, and frequently changing orientations of the device with respect to the platform.

Mobile devices can also come equipped with magnetometers, and in some cases, it has been shown that a navigation solution using accelerometers and magnetometers may be possible if the user is careful enough to keep the device in a specific orientation with respect to their body, such as when held carefully in front of the user after calibrating the magnetometer.

There is a need, however, for a method of providing a navigation solution that is capable of accurately utilizing measurements from a navigation-capable device within a platform, and thereby determining the navigation state of the device/platform without any constraints on the platform (i.e., in indoor or outdoor environments) or the mobility of the device within the platform. The estimation of the position and attitude of the platform should be independent of the usage of the device (e.g., the way the user is holding or moving the device during navigation). There is also a need for such a method to allow for the device to be tilted in any orientation while still providing seamless navigation information without degradation in performance.

A method and apparatus is needed for enhancing a navigation solution of a device within a platform, wherein mobility of the device may be constrained or unconstrained within the platform, and wherein the device can be tilted to any orientation and still provide seamless navigation.

SUMMARY

The present method and apparatus runs a first filter to provide the navigation solution, and at least one second filter that provides values to be used in the first filter to enhance the navigation solution.

The present disclosure relates to a method and apparatus for enhancing a navigation solution of a device within a platform (such as for example person, vehicle, or vessel) through the use of at least two filters, wherein mobility of the device may be constrained or unconstrained within the platform, and wherein the device can be tilted to any orientation and still provide a seamless navigation solution without degradation in performance of said navigation solution.

The present method may be used for a navigation solution utilizing measurements (readings) from sensors (such as for example, accelerometers, gyroscopes, magnetometers, barometer etc.) within the device, whether in the presence or in the absence of absolute navigational information (such as, for example, Global Navigation Satellite System (GNSS) or WiFi™ positioning).

The present device includes sensors capable of providing sensor readings, and said sensors having a corresponding frame for the sensors' axes.

The present method and apparatus may be used whether in the presence or in the absence of absolute navigational information.

In some embodiments, the at least one second filter provides values to be used in the first filter to enhance the navigation solution instead of taking those values from the first filter to avoid double feedback problems that may deteriorate the performance or make it unstable. In a first group of those embodiments, the second filter provides heading angle that will be used alone or with other quantities (such as heading misalignment estimated by separate techniques) in a dead-reckoning solution (such as pedestrian dead-reckoning, vehicular dead reckoning, or cycling dead-reckoning), which in turn will provide measurement updates to the first filter to enhance the navigation solution. In a second group of those embodiments, the second filter provides heading angle for calculation of heading misalignment between device and platform by subtracting the platform heading from absolute navigation information (when available) from the second filter heading; the calculated heading misalignment is used by the first filter to enhance the navigation solution. In a third group of those embodiments, the second filter provides roll and pitch angles to be used by the first filter to enhance the navigation solution. One way to achieve this in this third group of embodiments, the second filter provides roll and pitch to be used in the calculation of the transformation matrix between the device frame and platform frame, which is in turn used by the first filter to enhance the navigation solution. Heading misalignment, whether estimated by separate techniques or by the second group of embodiments above, can be used together with roll and pitch misalignments to form the transformation matrix between the device frame and platform frame. In a fourth group of embodiments, any combination of the above three groups of embodiments may be used.

In some embodiments, the at least one second filter provides values to be used in the first filter to enhance the navigation solution by providing those values before the first filter initializes or re-initializes in order to have a better initialization or re-initialization for the first filter, which in turn will enhance the navigation solution. This happens while the first filter is in an alignment phase before going to navigation phase (i.e., the first filter initializes or re-initializes in an alignment phase to go to navigation phase). In a first group of those embodiments, the second filter operates to provide roll and pitch angles before the first filter initializes or re-initializes in order to have a better initialization or re-initialization for the first filter. In a second group of those embodiments, the at least second filter is a plurality of filters used to determine the initial misalignment between the device and platform. The initial misalignment may be the initial heading misalignment. In a third group of embodiments, any combination of the above two groups of embodiments may be used. As used herein, initialization may include re-initialization.

In some embodiments, the at least one second filter provides values to be used in the first filter to enhance the navigation solution by possibly providing those values after a timeout were the at least second filter runs in parallel with the first filter with different assumptions during this timeout period. The timeout period starts when a certain phenomenon happens, which involve some ambiguity regarding the navigation solution. At the end of the timeout period a decision is made regarding the more correct assumption; in case the assumption of the first filter was the more correct one, then this filter will remain running and any other filter may be dismissed, otherwise the one of the at least second filter with the most correct assumption will provide all its values to fully override the first filter, the overridden first filter will then run and all other filters may be dismissed.

It is understood that any one of the foregoing embodiments may be used, either alone or in combination.

Broadly stated, in some embodiments, a method and apparatus that utilizes multiple filters for enhancing a navigation solution of a device within a platform, said device having sensors capable of providing sensor readings, wherein mobility of the device may be constrained or unconstrained within the platform, and wherein the device can be tilted to any orientation without degradation in performance of said navigation solution, the method as defined herein.

DETAILED DESCRIPTION

Figure 1C:
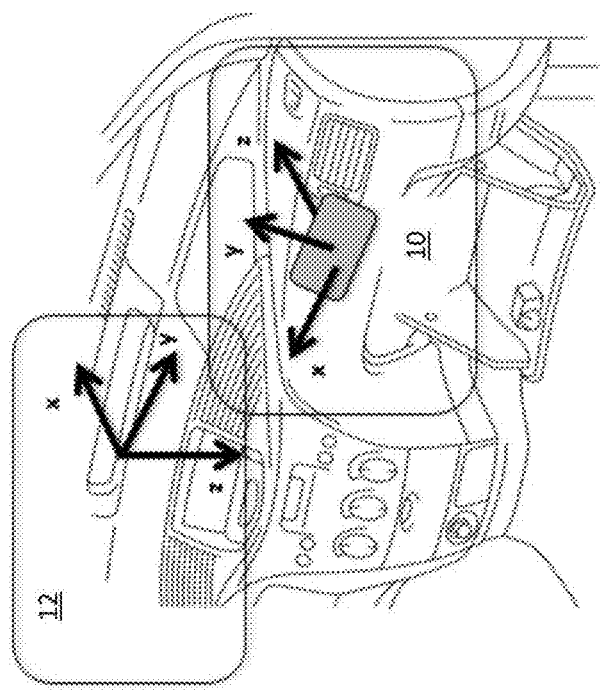
FIG. 1C depicting one embodiment where the platform is a vehicle.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments.

These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary portable devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The present disclosure relates to a method and apparatus for enhancing a navigation solution of a device within a platform (such as for example person, vehicle, or vessel) through the use of at least two filters, wherein mobility of the device may be constrained or unconstrained within the platform, and wherein the device can be tilted to any orientation and still provide a seamless navigation solution without degradation in performance of said navigation solution. As used herein, the term "navigation solution" means information concerning the position, motion and/or orientation of the device. In one aspect, the navigation solution may include any combination of position, velocity and/or attitude information. For example, a complete navigation solution may include position, velocity and attitude information and a partial navigation solution may include only position and attitude, only attitude and velocity, only attitude or other combinations. A navigation solution may also include values derived from other navigation solution values, such as speed and/or distance traveled.

The platform may be a motion-capable platform that may be temporarily stationary. Some example platforms may be a person, a vehicle or a vessel of any type. The vessel may be land-based, marine or airborne.

Absolute navigational information is information related to navigation and/or positioning and are provided by "reference-based" systems that depend upon external sources of information, such as for example Global Navigation Satellite Systems (GNSS). On the other hand, self-contained navigational information are information related to navigation and/or positioning and are provided by self-contained and/or "non-reference based" systems within a device/platform, and thus need not depend upon external sources of information that can become interrupted or blocked. Examples of self-contained information are readings from motion sensors such as accelerometers and gyroscopes.

The present method may be used for a navigation solution utilizing measurements (readings) from sensors (such as for example, accelerometers, gyroscopes, magnetometers, barometer etc.) within the device, whether in the presence or in the absence of absolute navigational information (such as, for example, Global Navigation Satellite System (GNSS) or WiFi positioning).

The present device includes sensors capable of providing sensor readings, and said sensors having a corresponding frame for the sensors' axes. The device further includes a processor operative to process the present method The present method and apparatus may be used whether in the presence or in the absence of absolute navigational information.

A filter used to provide a navigation solution is a state estimation technique, whether linear, nonlinear or a combination thereof. Different examples of filters used to provide a navigation solution may be a Kalman filter, an Extended Kalman filter, a non-linear filter such as a particle filter, among others. The filter or state estimation technique is capable of integrating information from different sensors and/or systems, such as for example accelerometers, gyroscopes, magnetometers, barometer, odometer, wheel encoders, or absolute navigational information (such as for example GNSS, WiFi, . . . ). The filter can estimate any one or any combination of: (i) 1D, 2D, 3D position; (ii) 1D, 2D, 3D velocity; (iii) 1D, 2D, 3D attitude angles; (iv) sensor errors depending on which sensors are used and which types of errors they have, such as for example accelerometer biases/drifts and scale factors, gyroscope biases/drifts and scale factors, magnetometer biases and scale factors, barometer offset, odometer scale factor; (v) errors in absolute navigational information.

The present method may be used in a variety of applications including those that involve navigation solutions about a device and/or platform including:
position, velocity and attitude or
only position and attitude,
or partial navigation solution including:
only attitude and velocity or
only attitude.

During normal use, the attitude of a device (e.g., portable phone) changes freely. Indeed, mobile devices often undergo rotational movements along any of their major axes, which constitutes its axes frame 10 (e.g., the x-axis, y-axis and z-axis) when positioned, for example, for texting in either landscape or portrait view, when positioned on a belt, in a pocket, or near a user's ear during phone use (where the device is a phone). Such axes and their frame 10 are defined in FIGS. 1(a), (b) and (c). Having regard for FIG. 1(a) the forward axis of the device is defined as x-axis, the vertical or z-axis is pointing downward and the transversal axis or y-axis is defined in a way to complete the right handed coordinate system.

Figure 1B:
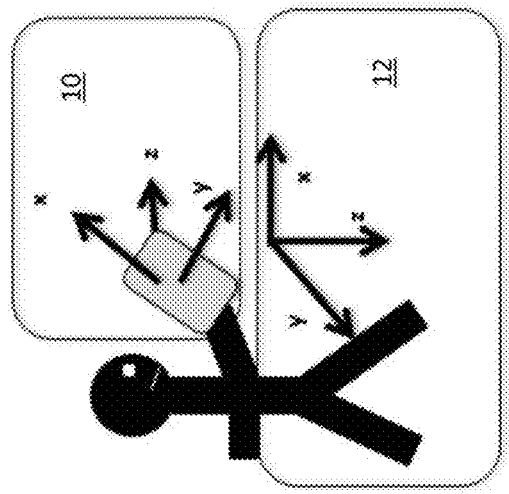
FIG. 1A shows the sensitive axes of the device; with FIG. 1B depicting a one embodiment showing the device and the platform, where the platform is a person.
Figure 1A:
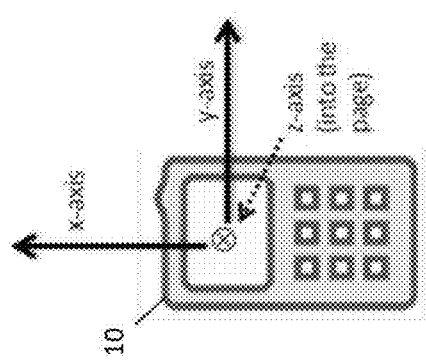

The orientation of a device within a platform is not representative of the orientation of the platform. Having regard to FIGS. 1(b) and (c), the device may undergo any number of rotational movements along any of its major axes, with respect to the platform 12. Rotational movements of the device do not indicate that the platform is going through the same changes in orientation. For example, the user or platform may be moving on a leveled 2D plane while the device may be undergoing any number of possible roll and pitch angles. FIGS. 1(b) and (c) show several possible relationships between an unconstrained device 10 and different platforms 12.

Typical portable devices may include accelerometers for measuring accelerations or specific forces, gyroscopes for measuring angular rates, along each of the sensitive axis, i.e., the x-axis, y-axis and the z-axis. The device may contain other sensors such as for example magnetometers, barometer, among others. "Roll" is defined as the rotation of the device along the forward x-axis, while "pitch" is the rotation along the lateral y-axis. Because the device user is free to rotate the device as desired, the device can have several changes in roll, pitch and heading with respect to the platform.

Figure 2:
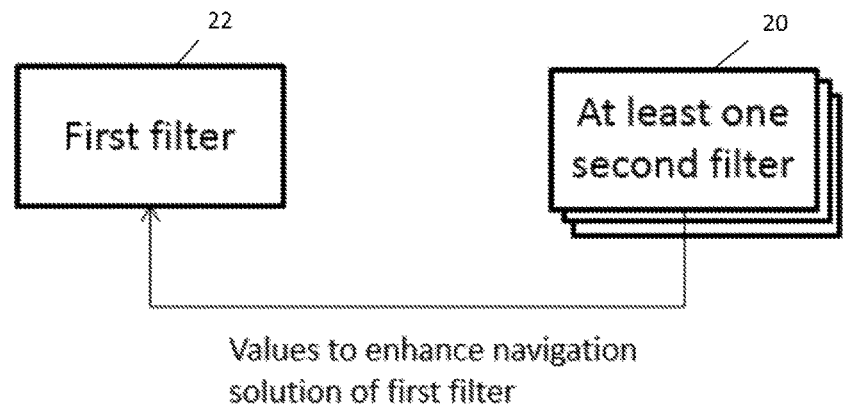
FIG. 2 shows a block diagram of one embodiment of the present method.

The present method and apparatus runs a first filter to provide the navigation solution, and at least a second filter that provide values to be used in the first filter to enhance the navigation solution. FIG. 2 shows a schematic diagram of an embodiment of the present method.

In some embodiments, as indicated by FIG. 2, the at least one second filter 20 provides values to be used in the first filter 22 to enhance the navigation solution instead of taking those values from the first filter to avoid double feedback problems that may deteriorate the performance or make it unstable.

Figure 3:
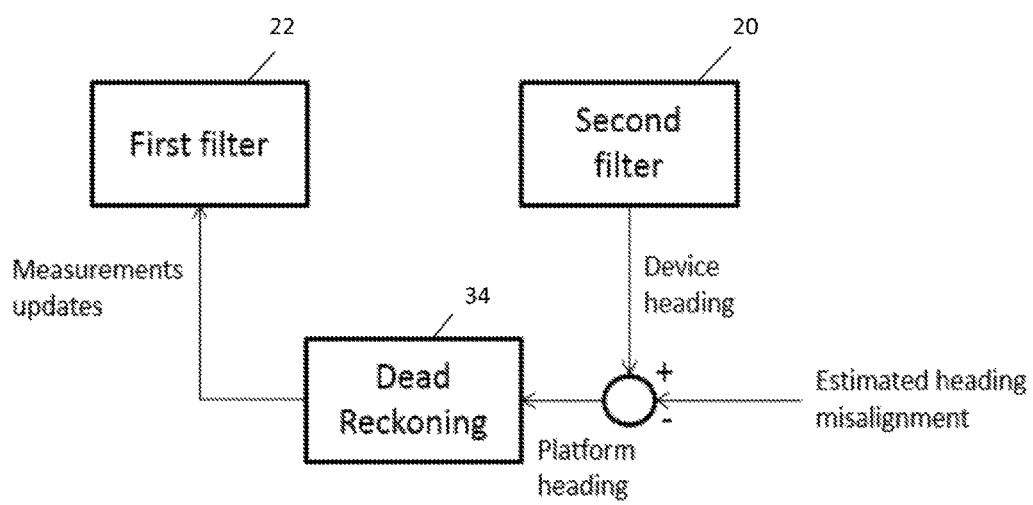
FIG. 3 shows a block diagram of one embodiment of the present method.

The following discusses a first group of those embodiments indicated by FIG. 3, where the at least second filter 20 provides values to be used in the first filter 22 to enhance the navigation solution instead of taking those values from the first filter to avoid double feedback problems that may deteriorate the performance or make it unstable. The second filter provides heading angle that will be used alone or with other quantities (such as heading misalignment estimated by separate techniques) in a dead-reckoning solution 34 (such as pedestrian dead-reckoning (PDR), vehicular dead reckoning, or cycling dead-reckoning), which in turn will provide measurement updates to the first filter to enhance the navigation solution. This will achieve decoupling of the heading information (as it is coming from the second filter) and make it not affected by other factors that can affect the solution of the first filter, such as the dead-reckoning updates and other updates that may be used in a way to optimize position estimates of the first filter but that is not optimal for the heading estimate of that filter (one example of the other updates is the way of handling absolute navigational information updates such as GNSS or WiFi™). In addition to the decoupling benefit, the following explains the double feedback and how the usage of a second filter avoids it. The dead-reckoning results depend on the heading provided for this dead-reckoning routine; in case the heading provided to the dead-reckoning routine comes from the first filter estimate and then the dead-reckoning results are used as measurement updates to the first filter, a double feedback problem can happen, performance can deteriorate, and/or the first filter can become unstable. For example, if the heading is drifting, it will start drifting more and more because of the dead-reckoning updates to the first filter, as the dead-reckoning updates will be drifting as well. This double feedback can cause the overall solution to deteriorate hugely or to become fully unstable. It is to be noted that the application of dead-reckoning updates to the first filter with the avoidance of double feedback through the usage of the second filter heading provides better positioning performance of the navigation solution from the first filter. The dead-reckoning routine may run just the corresponding dead-reckoning equations or it may run its own filter (different from the first and second filters). In the latter case where the dead-reckoning routine runs its own filter, this filter can integrate the solution from the dead-reckoning equations with other systems or sensors, such as for example absolute navigational information. One of the examples for the application of dead-reckoning solution is for application of PDR in a person walking or a person running cases, and an example of first filter can be a filter that runs with an INS to estimate position, velocity, attitude, and inertial sensors errors. In these aforementioned examples the PDR update to the first filter provides better positioning performance of the navigation solution as well as helps estimating the inertial sensors errors, which in turn helps enhancing the performance. The decoupling between the first and second filters enables optimizing the second filter performance for heading estimation and optimizing the first filter performance for position estimation. FIG. 3 shows an exemplary schematic diagram of an embodiment from this first group of embodiments discussed above.

Figure 4:
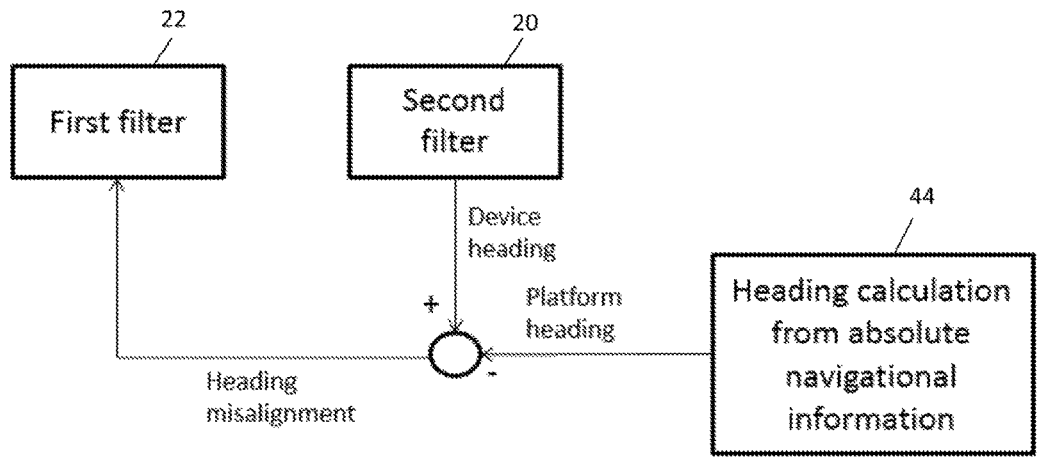
FIG. 4 shows a block diagram of one embodiment of the present method.

The following discusses a second group of those embodiments, as indicated by FIG. 4, where the at least second filter 20 provides values to be used in the first filter 22 to enhance the navigation solution instead of taking those values from the first filter to avoid double feedback problems that may deteriorate the performance or make it unstable. The second filter provides heading angle for calculation of heading misalignment between device and platform by subtracting the platform heading from absolute navigation information 44 (when available) from the second filter heading; the calculated heading misalignment is used by the first filter to enhance the navigation solution. This will achieve decoupling of the heading misalignment information (as it is coming from the second filter) and make it not affected by other factors that can affect the solution of the first filter, such as updates that may be used in a way to optimize position estimates of the first filter but that is not optimal for the heading estimate of that filter, and thus for the heading misalignment calculation. One example of those updates is the way of handling absolute navigational information updates such as GNSS or wireless network positioning (such as WiFi™). In addition to the decoupling benefit, the following explains the double feedback and how the usage of a second filter avoids it. The heading misalignment calculation depends on the heading estimate provided; in case the heading provided for the misalignment calculation comes from the first filter estimate and then the calculated misalignment is used in the first filter, a double feedback problem can happen, performance can deteriorate, and/or the first filter can become unstable. For example, if the estimated heading is drifting, heading misalignment will be drifting as well, and thus heading may drift more and so on. This double feedback can cause the overall solution to deteriorate hugely or to become fully unstable. FIG. 4 shows an exemplary schematic diagram of an embodiment from this second group of embodiments discussed above.

Figure 5:
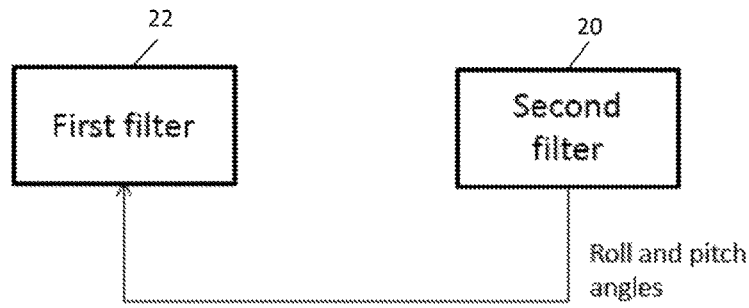
FIG. 5 shows a block diagram of one embodiment of the present method.

The following discusses a third group of those embodiments, as indicated by FIG. 5, where the at least second filter 20 provides values to be used in the first filter 22 to enhance the navigation solution instead of taking those values from the first filter to avoid double feedback problems that may deteriorate the performance or make it unstable. The second filter provides roll and pitch angles to be used by the first filter to enhance the navigation solution. One way to achieve this in this third group of embodiments, the second filter provides roll and pitch to be used in the calculation of the transformation matrix between the device frame and platform frame, which is in turn used by the first filter to enhance the navigation solution. Heading misalignment, whether estimated by separate techniques or by the second group of embodiments above, can be used together with roll and pitch angles, or roll and pitch misalignments to form the transformation matrix between the device frame and platform frame. This will achieve decoupling of the roll, pitch, roll misalignment, pitch misalignment, or heading misalignment information (as it is coming from the second filter) and make it not affected by other factors that can affect the solution of the first filter, such as updates that may be used in a way to optimize position estimates of the first filter but that is not optimal for the roll, pitch, and/or heading estimate of that filter, and thus for the roll, pitch, and/or heading misalignment calculation. One example of those updates is the way of handling absolute navigational information updates such as GNSS or wireless network positioning (such as WiFi™). In addition to the decoupling benefit, the following explains the double feedback and how the usage of a second filter avoids it. In case the roll, pitch, roll misalignment, pitch misalignment, or heading misalignment comes from the first filter estimate and then are used in the first filter, a double feedback problem can happen, performance can deteriorate, and/or the first filter can become unstable. For example, if the estimated roll, pitch, and/or heading are drifting, roll misalignment, pitch misalignment, and/or heading misalignment will be drifting as well, and thus roll, pitch, and/or heading may drift more and so on. This double feedback can cause the overall solution to deteriorate hugely or to become fully unstable. One example of the utilization of roll, pitch, roll misalignment, pitch misalignment, and/or heading misalignment to form the transformation matrix between the device frame and platform frame, and to further use this to enhance the performance of the navigation solution from the first filter is through the use of motion constraints on the platform to provide measurement updates for the first filter, such as measurement updates from Non-Holonomic Constraints (NHC). FIG. 5 shows an exemplary schematic diagram of an embodiment from this third group of embodiments discussed above.

The following discusses a third group of those embodiments, as indicated by FIG. 5, where the at least second filter 50 provides values to be used in the first filter 52 to enhance the navigation solution instead of taking those values from the first filter to avoid double feedback problems that may deteriorate the performance or make it unstable. The second filter provides roll and pitch angles to be used by the first filter to enhance the navigation solution. One way to achieve this in this third group of embodiments, the second filter provides roll and pitch to be used in the calculation of the transformation matrix between the device frame and platform frame, which is in turn used by the first filter to enhance the navigation solution. Heading misalignment, whether estimated by separate techniques or by the second group of embodiments above, can be used together with roll and pitch angles, or roll and pitch misalignments to form the transformation matrix between the device frame and platform frame. This will achieve decoupling of the roll, pitch, roll misalignment, pitch misalignment, or heading misalignment information (as it is coming from the second filter) and make it not affected by other factors that can affect the solution of the first filter, such as updates that may be used in a way to optimize position estimates of the first filter but that is not optimal for the roll, pitch, and/or heading estimate of that filter, and thus for the roll, pitch, and/or heading misalignment calculation. One example of those updates is the way of handling absolute navigational information updates such as GNSS or WiFi. In addition to the decoupling benefit, the following explains the double feedback and how the usage of a second filter avoids it. In case the roll, pitch, roll misalignment, pitch misalignment, or heading misalignment comes from the first filter estimate and then are used in the first filter, a double feedback problem can happen, performance can deteriorate, and/or the first filter can become unstable. For example, if the estimated roll, pitch, and/or heading are drifting, roll misalignment, pitch misalignment, and/or heading misalignment will be drifting as well, and thus roll, pitch, and/or heading may drift more and so on. This double feedback can cause the overall solution to deteriorate hugely or to become fully unstable. One example of the utilization of roll, pitch, roll misalignment, pitch misalignment, and/or heading misalignment to form the transformation matrix between the device frame and platform frame, and to further use this to enhance the performance of the navigation solution from the first filter is through the use of motion constraints on the platform to provide measurement updates for the first filter, such as measurement updates from Non-Holonomic Constraints (NHC). FIG. 5 shows an exemplary schematic diagram of an embodiment from this third group of embodiments discussed above.

In a fourth group of those embodiments where the at least second filter provides values to be used in the first filter to enhance the navigation solution instead of taking those values from the first filter to avoid double feedback problems that may deteriorate the performance or make it unstable, any combination of the above three groups of embodiments may be used.

In some embodiments, the at least second filter provides values to be used in the first filter to enhance the navigation solution by providing those values before the first filter initializes or re-initializes in order to have a better initialization or re-initialization for the first filter, which in turn will enhance the navigation solution. As used herein, initialization may include re-initialization.

Figure 6:
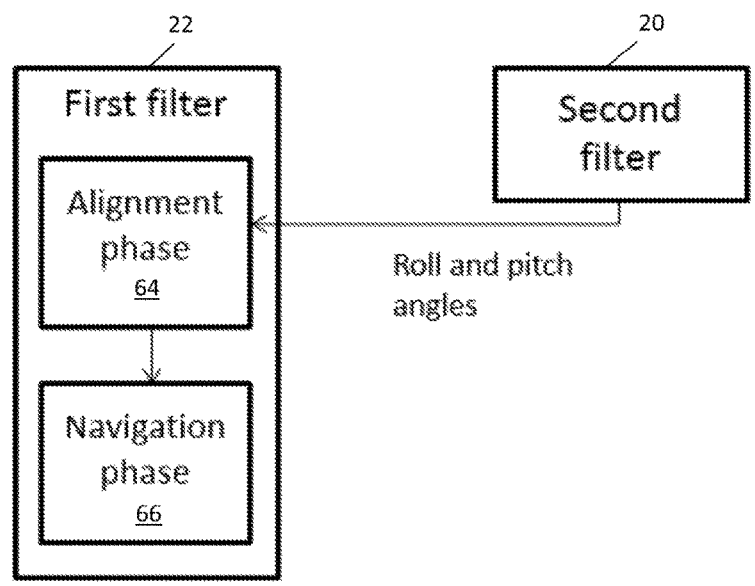
FIG. 6 shows a block diagram of one embodiment of the present method.

The following discusses a first group of those embodiments, as indicated by FIG. 6, where the at least second filter 20 provides values to be used in the first filter 22 before the first filter initializes or re-initializes in order to have a better initialization or re-initialization. The second filter operates to provide roll and pitch angles before the first filter initializes or re-initializes in order to have a better initialization or re-initialization for the first filter. This happens while the first filter is in an alignment phase before going to navigation phase (i.e. the first filter initializes or re-initializes in an alignment phase 64 to go to navigation phase 66), to have a better initialization or re-initialization for the first filter and thus having a better solution in navigation phase. FIG. 6 shows an exemplary schematic diagram of an embodiment from this first group of embodiments discussed above.

Figure 7:
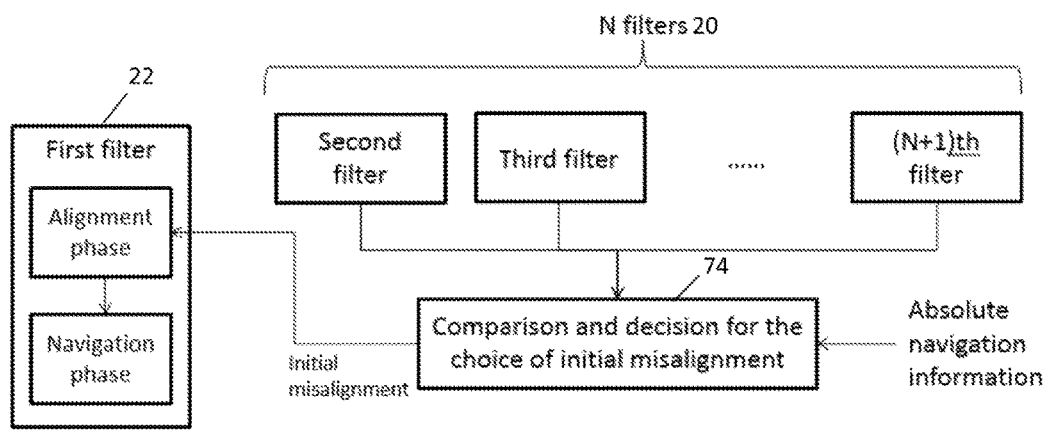
FIG. 7 shows a block diagram of one embodiment of the present method.

The following discusses a second group of those embodiments, as indicated by FIG. 7, where the at least second filter 20 provides values to be used in the first filter 22 before the first filter initializes or re-initializes in order to have a better initialization or re-initialization. The at least second filter is a plurality of filters used to determine the initial misalignment between the device and platform. Different misalignment candidates to cover the misalignment space are generated; each one is used in the initialization of one filter among the plurality of filters, absolute navigational information may be used for initialization together with the misalignment candidate. Each filter among the plurality of filters then runs without any absolute navigational information updates. After a certain period, the plurality of filters is stopped, and their results over the period of time are assessed by comparing each of them to the absolute navigational information in 74. If the resolution of the misalignment candidates and their coverage for the misalignment space is enough, then the initial misalignment is chosen to be the misalignment candidate used in the initialization of the best filter when compared to the absolute navigational information. If the resolution of the misalignment candidates and their coverage for the misalignment space is not enough, then a second round of running the plurality of filters can be performed. In this latter case, the best sector of misalignment candidates from the first round of running the plurality of filters is chosen based on the comparison with absolute navigational information. Different misalignment candidates to cover the chosen sector are generated; each one is used in the initialization of one filter among the plurality of filters in a similar manner to the first round. Each filter among the plurality of filters then runs in a similar manner to the first round. After a certain period, the plurality of filters is stopped and their results compared to the absolute navigational information. Either a best candidate misalignment is chosen or the procedure continues for more rounds. The initial misalignment may be the initial heading misalignment. The initial misalignment may be the initial roll, pitch, and/or heading misalignment. The absolute navigational information may be GNSS or wireless network positioning (such as WiFi™) among others. For demonstration of the above explained technique the following case is explained by way of example. In case the initial misalignment is the initial heading misalignment and in case the absolute navigational information is GNSS position and velocity, the comparison of the results of the plurality of filters to absolute navigational information may be: (i) by comparing the position results of each filter from the plurality of filters to the position from GNSS; (ii) by comparing the velocity results of each filter from the plurality of filters to the velocity from GNSS; (iii) by comparing the position and velocity results of each filter from the plurality of filters to the position and velocity from GNSS. FIG. 7 shows an exemplary schematic diagram of an embodiment from this second group of embodiments discussed above.

In a third group of those embodiments where the at least second filter provides values to be used in the first filter before the first filter initializes or re-initializes in order to have a better initialization or re-initialization, any combination of the above two groups of embodiments may be used.

Figure 8:
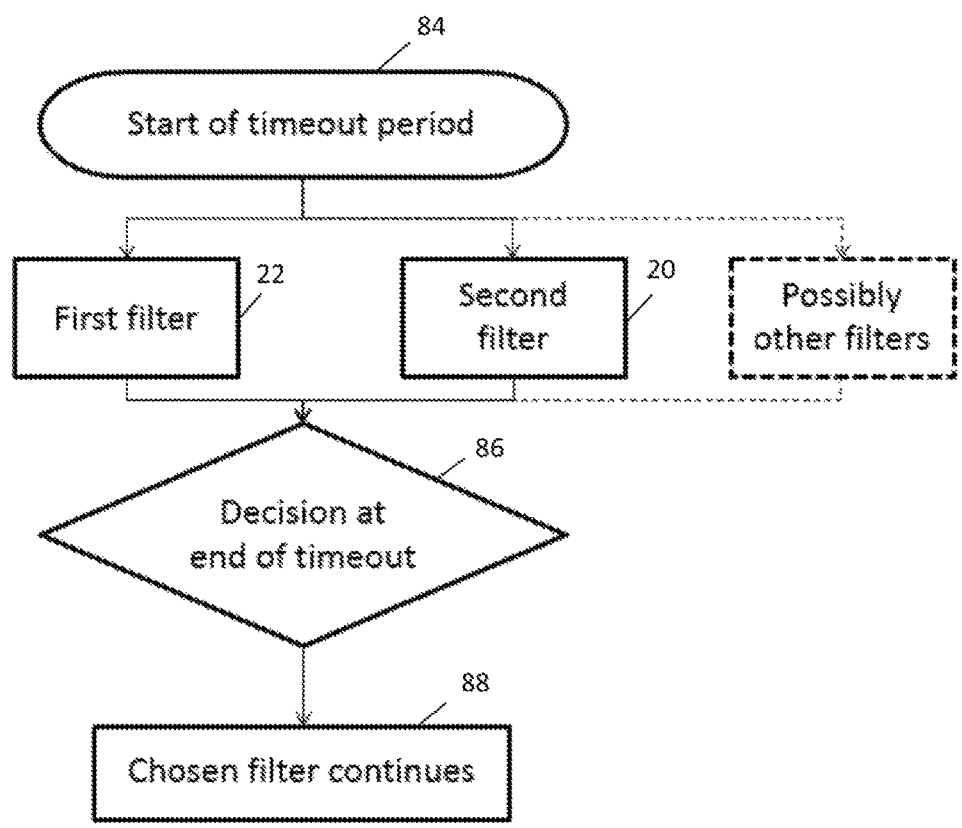
FIG. 8 shows a block diagram of one embodiment of the present method.

In some embodiments, as indicated by FIG. 8, the at least second filter 20 provides values to be used in the first filter 22 to enhance the navigation solution by possibly providing those values after a timeout were the at least second filter runs in parallel with the first filter with different assumptions during this timeout period. The timeout period starts in 84 when a certain phenomenon happens, which involve some ambiguity regarding the navigation solution. At the end of the timeout period a decision is made in 86 regarding the more correct assumption; in case the assumption of the first filter was the more correct one, then this filter will remain running and any other filter may be dismissed, otherwise the one of the at least second filter with the most correct assumption will provide all its values to fully override the first filter, the overridden first filter will then run and all other filters may be dismissed in 88. FIG. 8 shows an exemplary schematic diagram of an embodiment from this group of embodiments discussed above, wherein optional routines are shown with dotted lines and dotted boxes.

It is understood that any one of the foregoing embodiments may be used either alone or in combination.

The method and apparatus presented herein are applicable for navigation solutions, regardless of the type of navigation solution, regardless of the type of sensors used, and regardless of the type of the state estimation or filtering technique used in the navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

The present method and apparatus can be combined with a mode of conveyance technique or a mode detection technique to establish the mode of conveyance. This enables different scenarios such as for example walking, running, cycling and in vessel (such as driving) among other possible modes.

In addition to the applications of portable devices that involve a full navigation solution (including position, velocity and attitude, or position and attitude), there are other applications (that may involve estimating a full navigation solution, or an attitude only solution or an attitude and velocity solution) where the present method is needed for enhancing the user experience and usability, and may be applicable in a number of scenarios such as, for example: video gaming equipment; augmented reality equipment; or fitness devices.

Figure 9:
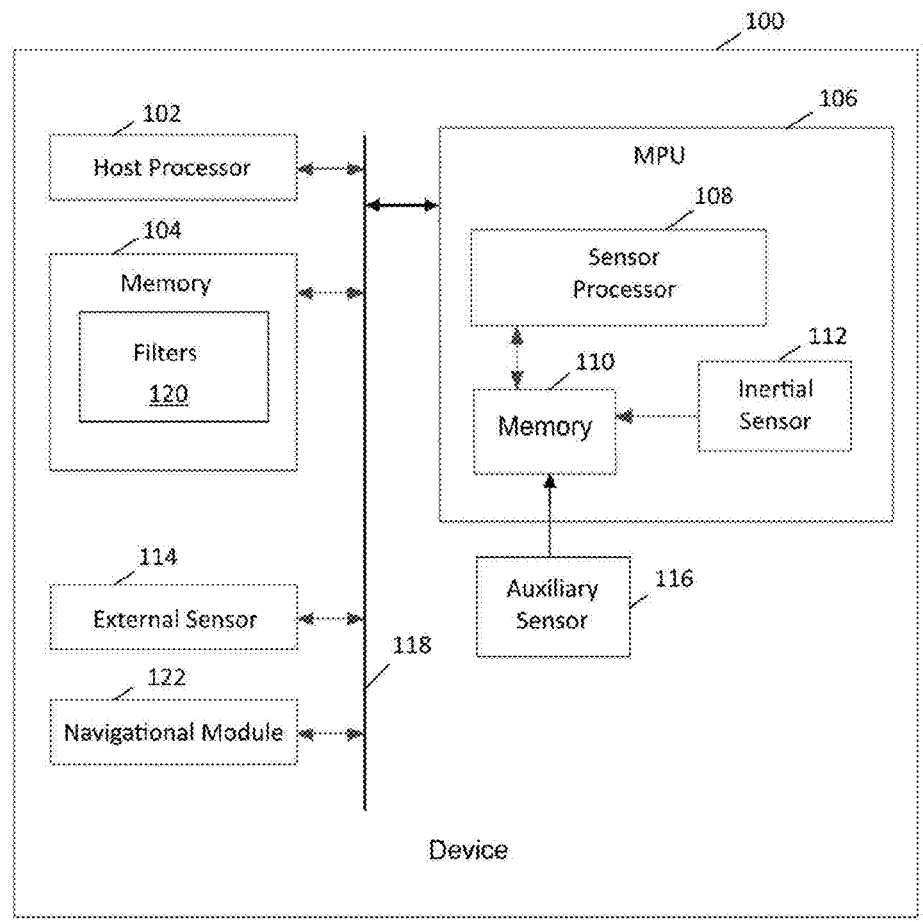
FIG. 9 is schematic diagram of a portable device for enhancing a navigation solution, according to an embodiment

As noted above, the portable device may include a sensor assembly including inertial motion sensors providing measurements that may be used in enhancing the navigation solution. To help illustrate these features, a representative portable device 100 is depicted in FIG. 9 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Alternatively, or in addition, device 100 may implement a sensor assembly in the form of external sensor 114. External sensor may represent one or more sensors as described above, such as an accelerometer and/or a gyroscope. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

Filters 120, which according to this disclosure may include the first filter and at least one second filter as described above with respect to FIGS. 2-8, may be implemented as a set of suitable instructions stored in memory 104 that may be read and executed by host processor 102. Other embodiments may feature any desired division of processing between host processor 102, MPU 106 and other resources provided by device 100, or may be implemented using any desired combination of software, hardware and firmware.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, a dedicated processor or any other processing resources of device 100.

Device 100 may also include navigational module 122 that employs a reference-based strategy, a self-contained strategy, or any combination of strategies. Navigational module 122 may provide any desired degree of location awareness capabilities. Representative technologies that may be embodied by navigational module 122 include global positioning system (GPS), global navigation satellite system (GLONASS), Galileo and Beidou, as well as WiFi™ positioning, cellular tower positioning, Bluetooth™ positioning beacons, dead reckoning or other similar methods. Navigational module 122 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Alternatively or in addition, navigational module 122 may employ inertial navigation techniques utilizing sensor data, such as from inertial sensor 112 and/or external sensor 114, as well as outputs from filters 120. Such techniques may involve dead reckoning or the like, and may determine an orientation for device 100, including values such as any roll, pitch, and azimuth (heading) angles.

Device 100 may be used for providing an enhanced navigation solution of the portable device and a platform, wherein the mobility of the device is constrained or unconstrained within the platform and wherein the device may be tilted to any orientation. As described above, device 100 may include a sensor assembly integrated within the portable device, configured to output data representing motion of the portable device and a processor may implement a first filter configured to output a navigation solution and may implement at least one second filter configured to use the motion sensor data to generate at least one value so that the at least one generated value is used with the first filter to enhance the navigation solution output by the first filter. The sensor assembly includes an accelerometer and a gyroscope. In some embodiments, the sensor assembly may be an inertial sensor implemented as a Micro Electro Mechanical System (MEMS).

As noted above, device 100 may be used in a method for enhancing a navigation solution of the device and a platform by obtaining motion sensor data corresponding to motion of the portable device, providing a first filter configured to output a navigation solution, providing at least one second filter configured to use the motion sensor data to generate at least one value and using the at least one generated value with the first filter to enhance the navigation solution output by the first filter.

In one aspect, the at least one generated value may be a heading angle of the portable device and wherein using the at least one generated value may include performing a dead reckoning calculation using the at least one generated value to provide measurement updates to the first filter for enhancing the navigation solution. The dead reckoning calculation may be a pedestrian dead reckoning calculation, a vehicular dead reckoning calculation or a cycling dead reckoning calculation. Using the at least one generated value may include deriving a platform heading from the portable device heading angle. Further, the platform heading may be derived by correcting the portable device heading angle with an estimated heading misalignment.

In one aspect, the at least one generated value may be a heading angle of the portable device such that using the at least one generated value may include estimating a heading misalignment of the portable device using the at least one generated value to provide the estimated heading misalignment to the first filter for enhancing the navigation solution. The heading misalignment may be estimated from the at least one generated value and a platform heading. The platform heading may be derived from a source of absolute navigational information, such as a global navigation satellite system (GNSS).

In one aspect, the at least one generated value may be roll and pitch values of the portable device. Further, using the at least one generated value may include obtaining a transformation between a device frame and a platform frame with the roll and pitch values. Transforming the device frame to the platform frame may also be based on an estimated heading misalignment of the portable device. The heading misalignment may be estimated from the portable device heading angle and a platform heading. Alternatively or in addition, the heading misalignment may be estimated from a dedicated heading misalignment estimation technique.

In one aspect, providing at least one second filter configured to use the motion sensor data to generate at least one value may reduce double feedback.

In one aspect, using the at least one generated value may include initializing the first filter. The at least one generated value may be roll and pitch values of the portable device. Initializing the first filter may occur during an alignment phase. Further, initializing the first filter may transition the first filter from the alignment phase to a navigation phase.

In one aspect, the at least one generated value may be an initial misalignment between the portable device and the platform. The initial misalignment may be derived from a plurality of filters. Each of the plurality of filters may output a candidate initial misalignment such that the at least one generated value is selected based at least in part on a comparison of the candidate initial misalignments. The comparison of the candidate initial misalignments may use a source of absolute navigation information. Further, initializing the first filter may occur during an alignment phase. Initializing the first filter may transition the first filter from the alignment phase to a navigation phase.

In one aspect, an ambiguity may be detected in the navigation solution output by the first filter so that the first filter and the at least one second filter may be run in parallel over a defined time window, wherein using the at least one generated value may include comparing the at least one generated value to a value output by the first filter during the defined time window to identify one of the filters as providing a more accurate output. The first filter and the at least one second filter may be provided with an alternative assumption regarding the detected ambiguity. Further, the at least one generated value may be provided to the first filter when the at least one second filter is identified as providing the more accurate output. The outputs of all the filters may be compared to identify the filter providing the more accurate output.

CONTEMPLATED EMBODIMENTS

The present disclosure describes the body frame to be x forward, y positive towards right side of the body and z axis positive downwards. It is contemplated that any body-frame definition can be used for the application of the present method and apparatus described herein.

It is contemplated that the present method and apparatus can be used with a navigation solution that may optionally utilize automatic zero velocity periods or static period detection with its possible updates and inertial sensors bias recalculations, non-holonomic updates, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the present method and apparatus can be used with a navigation solution that is further programmed to run, in the background, a routine to simulate artificial outages in the absolute navigational information and estimate the parameters of another instance of the state estimation technique used for the navigation solution of the present disclosure to optimize the accuracy and the consistency of the navigation solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g., GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation.

It is further contemplated that the present method and apparatus can be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the present method and apparatus can be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancement is the carrier-smoothed pseudorange.

It is further contemplated that the present method and apparatus can be used with a navigation solution that relies on an ultra-tight integration scheme between GNSS receiver and the other sensors' readings.

It is further contemplated that the present method and apparatus can be used with a navigation solution that uses various wireless communication systems that can also be used for positioning and navigation either as an additional aid (will be more beneficial when GNSS is unavailable) or as a substitute for the GNSS information (e.g., for applications where GNSS is not applicable). Examples of such wireless communication systems used for positioning are those provided by cellular phone towers and signals, radio signals, digital television signals, WiFi™, or Wimax™. For example, for cellular phone based applications, an absolute coordinate from cell phone towers and the ranges between the indoor user and the towers may be used for positioning and navigation, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. Wireless positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the present method and apparatus can be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device (s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the present method and apparatus can be used with various types of inertial sensors, other than MEMS based sensors described herein by way of example.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for enhancing a navigation solution of a portable device and a platform, wherein the method is operable when the mobility of the device is constrained within the platform and when the mobility of the device is unconstrained within the platform and wherein the device may be tilted to any orientation, the method further comprising:
    a) obtaining self-contained motion sensor data corresponding to motion of the portable device;
    b) providing a first filter configured to use at least the motion sensor data to generate and output a navigation solution, wherein the first filter is a state estimation technique;
    c) providing at least one second filter configured to use at least the motion sensor data to generate at least one value, wherein the at least one second filter is a state estimation technique;
    d) generating at least one value with the at least one second filter; and
    e) using the at least one generated value as input information to the first filter to enhance the navigation solution output by the first filter.

2. The method of claim 1, wherein the at least one generated value comprises a heading angle of the portable device and wherein using the at least one generated value comprises performing a dead reckoning calculation using the at least one generated value to provide measurement updates to the first filter for enhancing the navigation solution.

3. The method of claim 2, wherein the dead reckoning calculation comprises a pedestrian dead reckoning calculation.

4. The method of claim 2, wherein the dead reckoning calculation comprises a vehicular dead reckoning calculation.

5. The method of claim 2, wherein the dead reckoning calculation comprises a cycling dead reckoning calculation.

6. The method of claim 2, wherein using the at least one generated value comprises deriving a platform heading from the portable device heading angle.

7. The method of claim 6, wherein deriving the platform heading comprises correcting the portable device heading angle with an estimated heading misalignment.

8. The method of claim 1, wherein the at least one generated value comprises a heading angle of the portable device and wherein using the at least one generated value comprises estimating a heading misalignment of the portable device using the at least one generated value to provide the estimated heading misalignment to the first filter for enhancing the navigation solution.

9. The method of claim 8, wherein the heading misalignment is estimated from the at least one generated value and a platform heading.

10. The method of claim 9, wherein the platform heading is derived from a source of absolute navigational information.

11. The method of claim 10, wherein the source of absolute navigational information comprises a global navigation satellite system (GNSS).

12. The method of claim 1, wherein the at least one generated value comprises roll and pitch values of the portable device.

13. The method of claim 12, wherein using the at least one generated value comprises obtaining a transformation between a device frame and a platform frame with the roll and pitch values.

14. The method of claim 13, wherein transforming the device frame to the platform frame is also based on an estimated heading misalignment of the portable device.

15. The method of claim 14, wherein the heading misalignment is estimated from the portable device heading angle and a platform heading.

16. The method of claim 14, wherein the heading misalignment is estimated from a dedicated heading misalignment estimation technique.

17. The method of claim 1, wherein providing at least one second filter configured to use at least the motion sensor data to generate at least one value and generating at least one value with the at least one second filter reduces problematic double feedback.

18. The method of claim 1, wherein using the at least one generated value comprises initializing the first filter.

19. The method of claim 18, wherein the at least one generated value comprises roll and pitch values of the portable device.

20. The method of claim 19, wherein initializing the first filter occurs during an alignment phase.

21. The method of claim 20, wherein initializing the first filter transitions the first filter from the alignment phase to a navigation phase.

22. The method of claim 18, wherein the at least one generated value comprises an initial misalignment between the portable device and the platform.

23. The method of claim 21, wherein the initial misalignment is derived from a plurality of filters.

24. The method of claim 23, wherein each of the plurality of filters outputs a candidate initial misalignment and wherein the at least one generated value is selected based at least in part on a comparison of the candidate initial misalignments.

25. The method of claim 24, wherein the comparison of the candidate initial misalignments uses a source of absolute navigation information.

26. The method of claim 23, wherein initializing the first filter occurs during an alignment phase.

27. The method of claim 26, wherein initializing the first filter transitions the first filter from the alignment phase to a navigation phase.

28. The method of claim 1, further comprising detecting an ambiguity in the navigation solution output by the first filter and running the first filter and the at least one second filter in parallel over a defined time window, wherein using the at least one generated value comprises comparing the at least one generated value to a value output by the first filter during the defined time window to identify one of the filters as providing a more accurate output.

29. The method of claim 28, wherein the first filter and the at least one second filter are provided with an alternative assumption regarding the detected ambiguity.

30. The method of claim 28, further comprising providing the at least one generated value to the first filter when the at least one second filter is identified as providing the more accurate output.

31. The method of claim 28, further comprising comparing outputs of all the filters to identify the filter providing the more accurate output.

32. The method of claim 1, further comprising any combination of claims 2, 8, 12, 18, 19, 22 and/or 28.

33. A portable device for providing an enhanced navigation solution of the portable device and a platform, wherein the mobility of the device is constrained or unconstrained within the platform and wherein the device may be tilted to any orientation, the portable device comprising:
  a) a sensor assembly integrated within the portable device, configured to output data representing motion of the portable device; and
  b) a processor operable when the mobility of the device is constrained within the platform and when the mobility of the device is unconstrained within the platform, and wherein the processor is configured to:
  i) implement a first filter configured to output a navigation solution, wherein the at least one second filter is a state estimation technique;
  ii) implement at least one second filter configured to use the motion sensor data to generate at least one value, wherein the at least one second filter is a state estimation technique; and
  iii) use the at least one generated value as input information to the first filter to enhance the navigation solution output by the first filter.

34. The portable device of claim 33, wherein the sensor assembly includes an accelerometer and a gyroscope.

35. The device of claim 33, wherein the sensor assembly comprises an inertial sensor implemented as a Micro Electro Mechanical System (MEMS).

* * * * *